Nov. 27, 1956  W. R. ISOM  2,771,814
MULTIPLE MOTOR DRIVE FOR CAMERAS
Filed April 30, 1952  2 Sheets-Sheet 1

INVENTOR
Warren R. Isom
BY
ATTORNEY

Nov. 27, 1956

W. R. ISOM 2,771,814

MULTIPLE MOTOR DRIVE FOR CAMERAS

Filed April 30, 1952

INVENTOR
Warren R. Isom
BY
ATTORNEY

United States Patent Office 2,771,814
Patented Nov. 27, 1956

2,771,814

MULTIPLE MOTOR DRIVE FOR CAMERAS

Warren R. Isom, West Collingswood, N. J., assignor to Radio Corporation of America, a corporation of Delaware Application April 30, 1952, Serial No. 285,210

10 Claims. (Cl. 88—17)

This invention relates to drive mechanisms for photographic cameras, and particularly to a multiple motor drive for a kinescope recording camera.

It has been found desirable for driving the various sections of kinescope recording cameras, such as the take-up reels, shutters, and film advancing mechanisms, to employ a motor for each portion of the mechanism. Because of the extreme accuracy required for the shutter, an independently running motor is used therefor so that it will permit the splicing together on the film a portion of a picture from the raster of the kinescope during one field, with the complementary portion that appears on the kinescope one full field later. Furthermore, the film should be driven at as constant a speed as possible, but because of the intermittent loading of this motor, the speed is not always constant. If speed variations caused by this intermittent loading were reflected in the shutter, the splice cannot be successfully made.

Furthermore, the motor for the film take-up reel should be of the series type in order that its speed-torque curve provides satisfactory film take-up. Thus, the motors usually used may be a three-phase, one-tenth horsepower motor for the film drive, a single phase, one-seventy-fifth horsepower motor for the shutter, and 110-volt series motor, one-fiftieth horsepower for the take-up reel. Normally, the large film drive motor, which is necessary to provide the desired constancy of speed for the film advancement and the maintenance of the proper phase relationshp with the television system, overloads the camera gearing. This overloading, of course, produces gear failure, and it is not practical to increase the size of the gears to prevent such failure. To provide the necessary phase relationship between the shutter motor and the film drive motor, a pin-in-a-slot mechanism is used, and, to provide the necessary starting of the mechanism, a special circuit is used.

The principal object of the invention, therefore, is to facilitate the operation of a camera motor, particularly a kinescope camera motor.

Another object of the invention is to provide an improved motor drive for a photographic camera, particularly a kinescope recording camera.

A further object of the invention is to provide an improved starting circuit for operating plural motors of different sizes used in cameras.

Although the novel features which are believed to be characteristic of this invention will be pointed out with particularity in the appended claims, the manner of its organization and the mode of its operation will be better understood by referring to the following description, read in conjunction wtih the accompanying drawings, forming a part hereof, in which:

Figure 1:
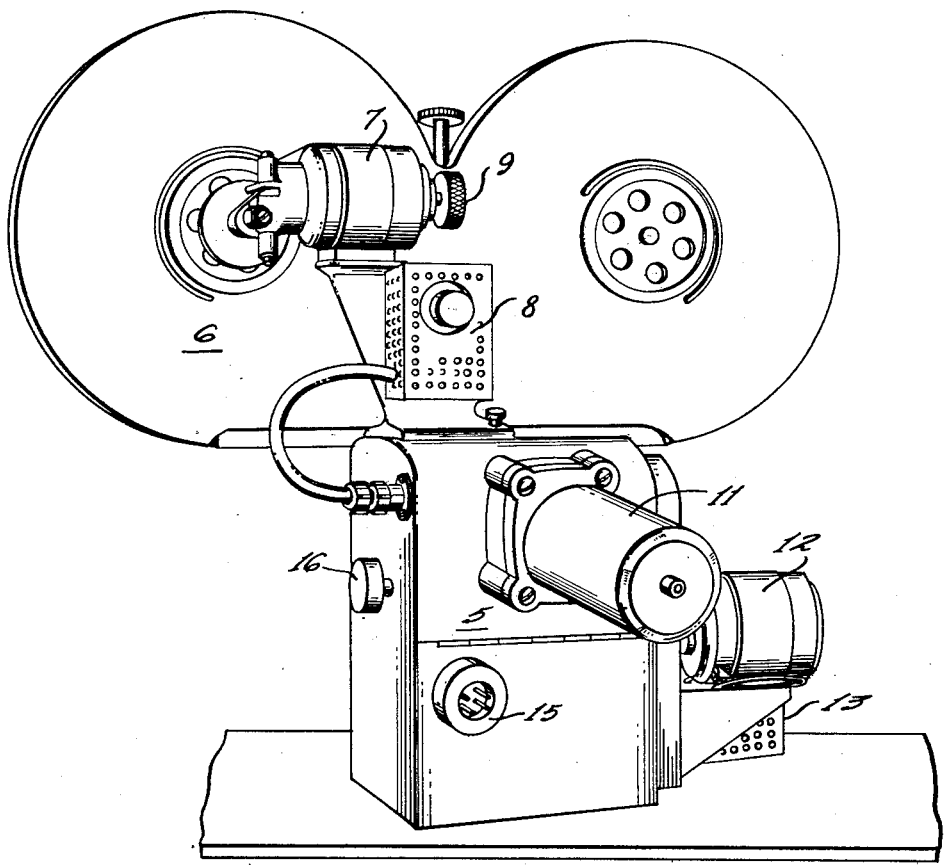
Fig. 1 is a perspective view of a kinescope recording camera embodying the invention.

Referring now to the drawings, in which the same numerals identify like elements, a camera case 5 has mounted thereon a film magazine 6, to which is attached a film take-up reel motor 7 with its hand knob 9, and to which is also attached a film tensioning rheostat 8. To the casing 5 is attached the film sprocket or film advancing motor 11, and also, the shutter motor 12 and a relay control resistor 13. A power terminal plug 15 is shown mounted on the lower portion of the case 5, and a hand knob is shown at 16.

Figure 2:
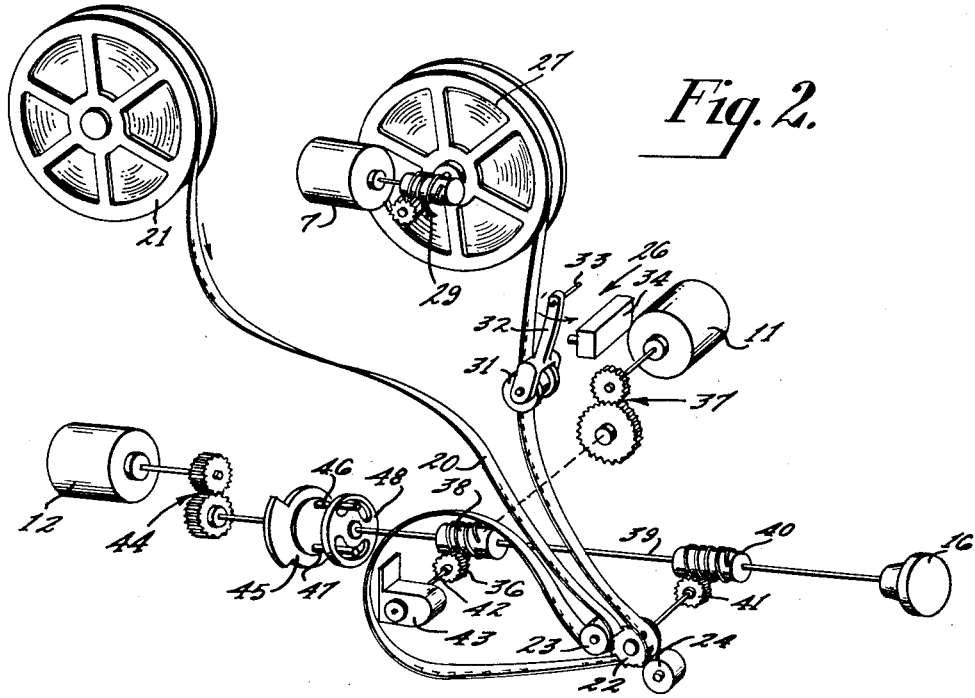
Fig. 2 is a diagrammatic perspective view of the main elements of the power mechanism and film path.
Figure 3:
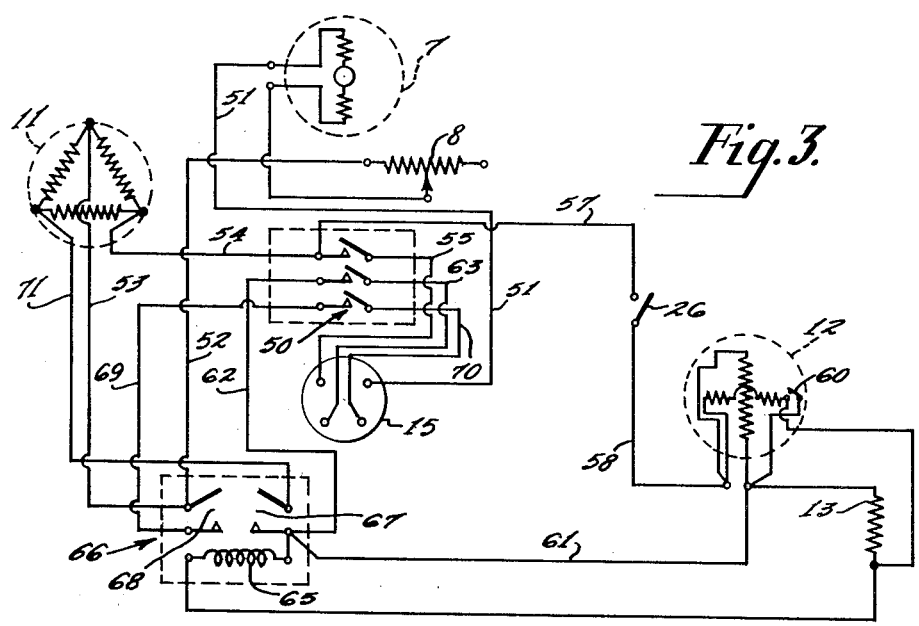
Fig. 3 is a schematic circuit diagram for the starting system of the motors of the camera.

Referring now to Figs. 2 and 3, a film 20 is shown being supplied from a supply reel 21 and passing through the camera around a sprocket 22 having pad rollers 23 and 24 and past an intermittent mechanism 43. The film then passes a film buckle switch mechanism 26 to a take-up reel 27 driven by the motor 7 through a worm and gear unit 29. The film buckle switch comprises a roller 31 on an arm 32 pivoted at 33 and which closes a contact in a microswitch 34 when the film is tensioned between the reel 27 and the sprocket 22.

The film drive motor 11 drives a helical gear 36 on a shaft 42 through a gear train unit 37, the helical gear 36 driving a helical gear 38. Gear 38 is on a shaft 39 on which is also located a worm 40 for driving a gear 41 on the shaft of sprocket 22. The hand knob 16 may be used to advance the film manually. The shaft 42 of gear 36 is shown driving the film intermittent mechanism 43.

The shutter motor 12 is shown driving through a gear train unit 44 a camera shutter 45. Two pins 46 and 47 extend from the central portion of the shutter 45 and are shown positioned within arcuate slots in a disc 48 on the shaft 39. The motors 11 and 12 are both synchronous motors and normally run at the same speed, but are mechanically linked together by the pin-and-slot mechanism just described. Thus, both motors are forced to maintain the same polarity of phase relationship to the power line, but may run independently of each other at operating speed.

Referring now particularly to Fig. 3, the system shown in Figs. 1 and 2 is operated by first closing the main three-phase power switch 50, which will energize the take-up motor 7 over a circuit from the plug 15 and including conductor 51, motor 7, film tensioning rheostat 8, conductor 52, conductor 53, the windings of three-phase motor 11, conductor 54, and conductor 55. Because of the voltage drop in the windings of motor 11, the motor 7 will be partially energized to give it a slow start and low power so as not to break the film before the camera starts. However, when started, and the film between the reel 27 and sprocket 22 is tightened, the switch 26 is closed, which will now energize the shutter motor 12. This energizing circuit is from the plug 15 over conductor 55, conductor 57, closed switch 26, conductor 58, the windings of single phase shutter motor 12, over closed centrifugal switch 60, conductor 61, conductor 62, and conductor 63. Thus, the low powered shutter motor will be energized, and through the pin and slot connection, will bring the film drive mechanism slowly up to speed, including the motor 11.

Near the top speed of the motor 12, the centrifugal switch 60 will be opened and the voltage drop across resistor 13 will energize the winding 65 of a relay 66. Energization of relay 66 will close its contacts 67 and 68 and the three-phase film advancing motor will be energized from the plug 15 over conductor 55, conductor 54, motor 11, conductor 53, closed contact 68, conductor 69, and conductor 70, the other phase of the power supply being over conductor 71, closed contact 67, conductor 62, and conductor 63. When contact 68 closes, film take-up motor 7 is fully energized through take-up tension adjustment rheostat 8 and over conductor 52, conductor 69, and conductor 70 to plug 15.

Since the mechanism has been brought practically to its running speed by the film shutter motor 12, the camera drive mechanism is not shocked when the three-phase motor 11 is energized. This avoids any drive mechanism failures and permits the use of a powerful film advancing motor without use of impractically large components in the mechanical drive of the camera. The pin and slot mechanism permits shutter motor 12 to drive the shutter at constant speed in the event any speed variations occur in the film advancing mechanism driven by motor 11.

I claim:

1. A multiple motor drive system for advancing film, reeling said film, and driving a light-interrupting shutter comprising a film advancing mechanism, a first synchronous motor connected to said mechanism for advancing film, a light interrupting shutter, a second synchronous motor connected to said shutter for interrupting light through said film, said first motor being adapted to advance said film at a predetermined rate with respect to the rotation of said shutter by said second motor, a take-up film reel, a motor connected to said take-up reel for reeling said film advanced by said mechanism, a mechanical interlock unit including mechanical connecting means between said film advancing mechanism driven by said first motor and said shutter driven by said second motor to permit independent operation of said first and second motors within certain predetermined limits, a power supply for said motors, a circuit for each of said motors from said power supply, a switch controlled by said reel motor for connecting said second motor to said power supply over its respective circuit, and a switch controlled by said second motor for connecting said first mentioned motor to said power supply over its respective circuit.

2. A multiple motor drive system in accordance with claim 1, in which said mechanical connecting means includes a member having slots therein and pin members positioned in said slots.

3. A multiple motor drive system in accordance with claim 1, in which said first switch is actuated by film pulled by said reel motor and said second switch is speed actuated to connect said first motor to said power supply.

4. An energizing system for multiple motors, comprising a power source, a film reel motor, a film reel, means for connecting said motor to said reel for winding film on said reel, a film advancing motor, a sprocket, means for connecting said film advancing motor to said sprocket for advancing said film to said reel, a shutter motor, a shutter for controlling the light through said film, means for connecting said shutter motor to said shutter, all of said motors being energized from said source when electrically connected thereto, and circuit means interconnecting said reel motor, said shutter motor, and said film advancing motor in that order, said circuit means including a circuit through said last mentioned motor to said power source and said reel motor, and a circuit including said shutter motor which is closed by said film, and means for closing a circuit from said film advancing motor to said power source after said shutter motor has been accelerated to a predetermined speed, and means for providing a flexible mechanical connection between said shutter motor and said film advancing motor.

5. An energizing system in accordance with claim 4, in which said circuit through said shutter motor includes a film operated switch adapted to be closed by film tension produced by energization of said reel motor, and said last mentioned means includes a centrifugal switch adapted to be opened when said shutter motor reaches a predetermined speed, and a relay adapted to be actuated upon the opening of said centrifugal switch for connecting said film advancing mechanism motor to said power source.

6. A multiple motor energizing system comprising a power source, a film reel motor, a film reel, means for connecting said film reel motor to said reel, a circuit between said motor and said source, a switch in said circuit for connecting said motor to said source when said switch is closed, a shutter motor, a shutter, means for connecting said shutter motor to said shutter, a second circuit between said shutter motor and said source, a second switch in said second circuit for connecting said shutter motor to said source, a film advancing motor, a sprocket for advancing film to said reel, means for connecting said film motor to said sprocket, a third circuit between said film advancing motor and said source, and a third switch in said third circuit for connecting said film advancing motor to said source, energization of said reel motor moving said film to actuate said second switch, and means actuated by the speed of said shutter motor for closing said third switch, and a flexible mechanical connection between said shutter motor and said film advancing motor.

7. A multiple motor energizing system in accordance with claim 6, in which said last mentioned means is a centrifugal switch and said third switch is a relay energized over said second circuit from said power source by the opening of said centrifugal switch.

8. A multiple motor energizing system in accordance with claim 6, in which said first circuit includes the windings of said film advancing motor until said third switch is closed.

9. A multiple motor starting system comprising a power source, three motors to be energized in serial order, circuit means for connecting a film reeling motor to said source through the windings of a second of said three motors, a second circuit means for connecting said third motor to said source, a switch in said second circuit means, said switch being actuated by film being reeled by said first motor, the actuation of said switch connecting said source to said third motor, a second centrifugal switch actuated by the rotation of said third motor at a certain speed, a third circuit means for connecting said second motor to said source, said means including a third switch energized upon operation of said second switch, operation of said third switch connecting said second mentioned motor to said power source over said third circuit means and said first mentioned motor directly to said power source, and a flexible mechanical connection between said second motor and said third motor.

10. A multiple motor starting system in accordance with claim 9, in which said first mentioned switch is closed by film, said second mentioned switch is opened centrifugally, and said third mentioned switch is closed electrically.

References Cited in the file of this patent
UNITED STATES PATENTS

| | | |
|---|---|---|
| 2,166,947 | Fayerweather | July 25, 1939 |
| 2,239,241 | Miller et al. | Apr. 22, 1941 |
| 2,244,880 | Howse | June 10, 1941 |
| 2,345,869 | Edwards | Apr. 4, 1944 |
| 2,487,476 | Pratt et al. | Nov. 8, 1949 |
| 2,529,896 | Askren | Nov. 14, 1950 |
| 2,542,189 | Gates et al. | Feb. 20, 1951 |